United States Patent
Han

(10) Patent No.: US 9,928,581 B2
(45) Date of Patent: Mar. 27, 2018

(54) IMAGE CONVERSION UNIT AND DISPLAY DEVICE HAVING THE SAME

(71) Applicant: LG Display Co., Ltd., Seoul (KR)

(72) Inventor: Tae Seong Han, Goyang-si (KR)

(73) Assignee: LG Display Co., Ltd., Seoul (KR)

( * ) Notice: Subject to any disclaimer, the term of this patent is extended or adjusted under 35 U.S.C. 154(b) by 219 days.

(21) Appl. No.: 14/885,674

(22) Filed: Oct. 16, 2015

(65) Prior Publication Data

US 2016/0117808 A1  Apr. 28, 2016

(30) Foreign Application Priority Data

Oct. 23, 2014 (KR) .................. 10-2014-0144006

(51) Int. Cl.
*G06T 5/00* (2006.01)
*G06T 3/40* (2006.01)
*G09G 3/20* (2006.01)

(52) U.S. Cl.
CPC ............ *G06T 5/009* (2013.01); *G06T 3/4007* (2013.01); *G09G 3/20* (2013.01); *G06T 2207/10024* (2013.01); *G06T 2207/20024* (2013.01); *G06T 2207/20208* (2013.01)

(58) Field of Classification Search
None
See application file for complete search history.

(56) References Cited

U.S. PATENT DOCUMENTS

2006/0028541 A1  2/2006 Haraguchi
2006/0197993 A1  9/2006 Yamanaka et al.

FOREIGN PATENT DOCUMENTS

| CN | 102461151 A | 5/2002 |
|----|-------------|--------|
| CN | 1440001 A | 9/2003 |
| EP | 1387319 A2 | 2/2004 |
| JP | 2011-133683 A | 7/2011 |

OTHER PUBLICATIONS

McKim ("The Ultimate Guide to the Frequency Separation Technique", 2013, https://fstoppers.com/post-production/ultimate-guide-frequency-separation-technique-8699).*
Librow ("Mean filter, or average filter", 2012, http://www.librow.com/articles/article-5).*
European Patent Office, Partial European Search Report, European Patent Application No. 15190844.9, dated Apr. 21, 2016, eight pages.
European Extended Search Report, European Application No. 15190844.9, dated Sep. 1, 2016, 16 pages.
Notification of the First Office Action for Chinese Patent Application No. CN 201510689242.0, dated Jan. 19, 2018, 23 Pages.

* cited by examiner

*Primary Examiner* — Xin Sheng
(74) *Attorney, Agent, or Firm* — Fenwick & West LLP

(57) ABSTRACT

Embodiments relate to a data conversion unit that includes: a bit mode transformer configured to transform a first bit mode image into a second bit mode image; a fixed frequency band component detector configured to detect a fixed frequency band component; and a image processor configured to apply a filter mask to regions of the second bit mode image opposite to the fixed frequency band component and output an interpolated second bit mode image. Such an image conversion unit can allow the gradation of a converted image to become finer. As such, the converted image can be more softly displayed.

17 Claims, 6 Drawing Sheets

IMAGE CONVERSION UNIT AND DISPLAY DEVICE HAVING THE SAME

CROSS-REFERENCE TO RELATED APPLICATION

The present application claims priority under 35 U.S.C. § 119(a) of Korean Patent Application No. 10-2014-0144006 filed on Oct. 23, 2014, which is hereby incorporated by reference in its entirety.

BACKGROUND

Field of the Disclosure

The present application relates to a display device adapted to display a high quality image.

Description of the Related Art

Recently, flat panel display devices are rapidly replacing cathode ray tubes (CRTs). The flat panel display devices include, among others, liquid crystal display (LCD) devices, plasma display panels (PDPs), and organic light emitting display (OLED) device.

Also, high quality HDR (high dynamic range) display devices are being actively researched. The HDR display devices can display a high quality image with high bit depth and high brightness.

Such an HDR display device transforms a low bit mode image into a high bit mode image and displays the high bit mode image. In such HDR display devices, the bit mode transform is simply performed by adding a small number of bits to the lowest bit of the low bit mode image. Due to this, contours must be generated in image displayed on the screen.

BRIEF SUMMARY

Accordingly, embodiments of the present application are directed to an image conversion unit and a display device having the same that substantially obviate one or more of problems due to the limitations and disadvantages of the related art.

The embodiments relate to provide an image conversion unit and a display device having the same which are adapted to effectively display a high bit image.

Additional features and advantages of the embodiments will be set forth in the description which follows, and in part will be apparent from the description, or may be learned by practice of the embodiments. The advantages of the embodiments will be realized and attained by the structure particularly pointed out in the written description and claims hereof as well as the appended drawings.

According to a general aspect of the present embodiments, an image conversion unit includes: a bit mode transformer, a fixed frequency band component detector, and an image processor. The bit mode transformer transforms a first bit mode image into a second bit mode image. The first bit mode image includes components of a first bit length. The second bit mode image includes components of a second bit length longer than the first bit length. The fixed frequency band component detector detects regions of the second bit mode image with a fixed frequency band component by processing the second bit image. The image processor applies a filter mask to the regions of the second bit mode image with the fixed frequency band component to generate an interpolated second bit mode image.

A display device according to a general aspect of the present embodiments includes: an image conversion unit which includes an image collector configured to collect a first bit mode image, a bit mode transformer configured to transform the first bit mode image into a second bit mode image, a fixed frequency band component detector configured to detect a fixed frequency band component, and a image processor configured to apply a filter mask to regions of the second bit mode image opposite to the fixed frequency band component and output an interpolated second bit mode image; and a display unit configured to display the interpolated second bit mode image from the image conversion unit.

Embodiments also relate to a method of converting image data. A first bit mode image including components of a first bit length is transformed into a second bit mode image of a second bit length longer than the first bit length. Regions of the second bit mode image with a fixed frequency band component are detected by processing the second bit image. A filter mask is applied to the regions of the second bit mode image with the fixed frequency band component to generate an interpolated second bit mode image Other systems, methods, features and advantages will be, or will become, apparent to one with skill in the art upon examination of the following figures and detailed description. It is intended that all such additional systems, methods, features and advantages be included within this description, be within the scope of the present disclosure, and be protected by the following claims. Nothing in this section should be taken as a limitation on those claims. Further aspects and advantages are discussed below in conjunction with the embodiments. It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the embodiments and are incorporated herein and constitute a part of this application, illustrate embodiment(s) of the present disclosure and together with the description serve to explain the disclosure. In the drawings.

DETAILED DESCRIPTION OF THE EMBODIMENTS

Figure 1:
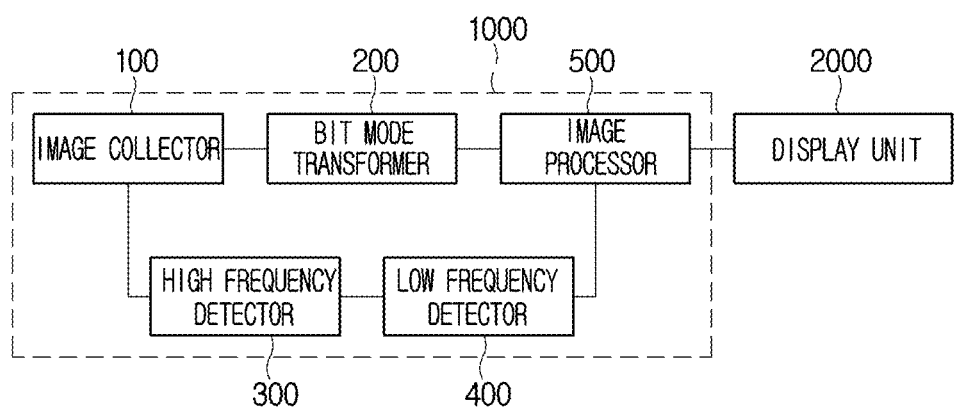
FIG. 1 is a block diagram showing a display device according to an embodiment of the present disclosure.

Reference will now be made in detail to an image conversion unit and a display device having the same in accordance with the embodiments of the present disclosure, examples of which are illustrated in the accompanying drawings. These embodiments introduced hereinafter are provided as examples in order to convey their spirits to the ordinary skilled person in the art. Therefore, these embodiments might be embodied in a different shape, so are not limited to these embodiments described here. In the drawings, the size, thickness and so on of a device can be exaggerated for convenience of explanation. Wherever possible, the same reference numbers will be used throughout this disclosure including the drawings to refer to the same or like parts.

FIG. 1 is a block diagram showing a display device according to an embodiment of the present disclosure. Referring to FIG. 1, a display device includes, among other components, an image conversion unit 1000 and a display unit 2000. The image conversion unit 1000 may include at least one processor and memory connected to the at least one processor. The memory may be a non-transitory computer readable storage medium. The following components of the image conversion unit 1000 may be embodied as hardware, software, firmware or a combination thereof.

The image conversion unit 1000 can include, among other components, an image collector 100 configured to collect first bit mode images (for example, 8-bit mode images), a bit mode transformer 200 configured to transform the first bit mode images into second bit mode images (for example, 10-bit mode images), a high frequency component detector 300 configured to detect a high frequency component from the first bit mode images, and a low frequency detector configured to detect a low frequency component from the high frequency component and provide as a fixed frequency band component. Also, the image conversion unit 1000 can include an image processor 500 configured to apply a mask to regions of the bit-transformed second bit mode image corresponding to the fixed frequency band component and generate an interpolated or filtered second bit mode image.

The image collector 100 can collect the first bit mode images which will be displayed on a screen. The first bit mode image displayed on the screen can be an 8-bit mode image.

The bit mode transformer 200 can perform a bit mode transform for the first bit mode image (hereinafter, '8-bit mode images') which are applied from the image collector 100.

Figure 2:
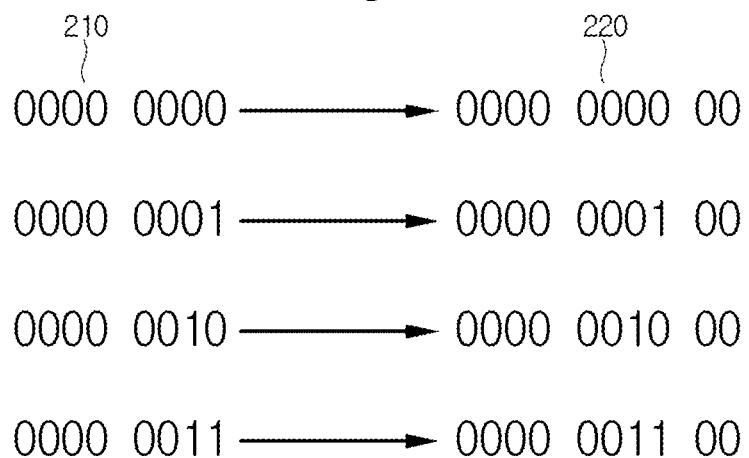
FIG. 2 is a diagram illustrating an operation of a bit mode transformer of an image conversion unit according to an embodiment of the present disclosure.

The image collected by the image collector 100 includes an 8-bit component 210 corresponding to a first bit mode component, as shown in FIG. 2. The bit mode transformer 200 can transform the 8-bit component 210 into the second bit mode component a 10-bit component 220, which corresponds to a second bit mode component, by adding two bits with a value of '00' to the lowest bit of the 8-bit component 210. In other words, the bit mode transformer 200 can transform the 8-bit mode image into the 10-bit mode image. Alternatively, the bit mode transformer 200 can transform the 8-bit component into a component of at least 10 bits by adding at least two bits to the lowest bit of the 8-bit component 210. Such transformation can simplify a complex arithmetic operation used for transforming a low bit mode image into a high bit mode image.

The high frequency component detector 300 can detect a high frequency component from the collected image which is applied from the image collector 100. The high frequency component detected by the high frequency component detector 300 can include high frequency red (hereinafter, 'R'), green (hereinafter, 'G') and blue (hereinafter, 'B') components. In order to detect the high frequency component, the high frequency component detector 300 can employ a mask. In detail, the high frequency component detector 300 can effectively detect the high frequency component using a high frequency detection mask.

Figure 3:
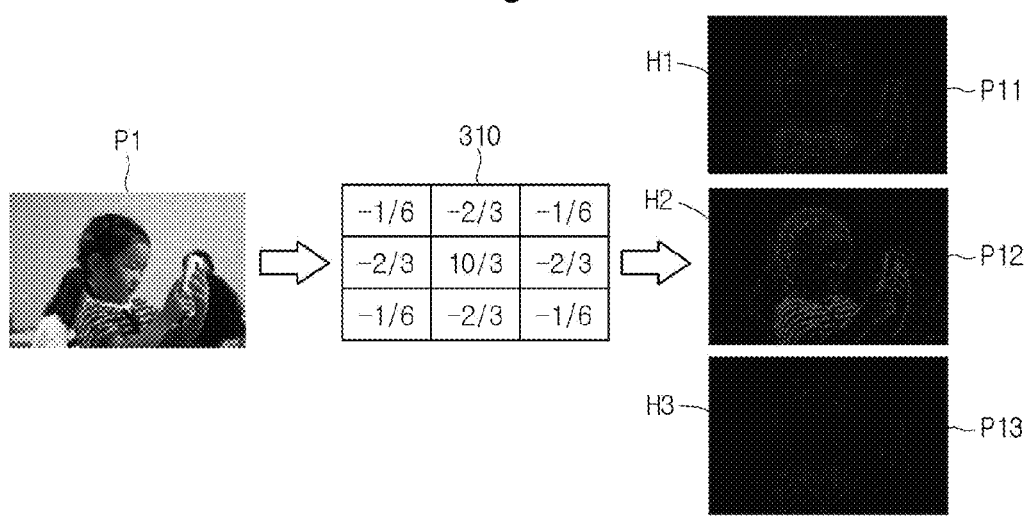
FIG. 3 is a diagram illustrating an operation of a high frequency component detector of an image conversion unit according to an embodiment of the present disclosure.

As shown in FIG. 3, when a 8-bit mode image P1 is applied from the image collector 100, the high frequency component detector 300 can detect high frequency R, G and B components H1, H2 and H3 from R, G and B images P11, P12 and P13 using the high frequency detection mask 310. The high frequency detection mask 310 can be a 3-by-3 mask. The high frequency R, G and B components can include pixel components each having a value not '0' (i.e., a value of at least '1') which is obtained by applying the high frequency detection mask 310.

The low frequency component detector 400 can detect (or extract) a low frequency component from the high frequency component detected by the high frequency component detector 300. To this end, the low frequency component detector 400 can compare the high frequency R, G and B components and selectively set any one of '1' and '0' according to the compared result. If any one of the high frequency R, G and B components is not '0', the low frequency component detector 400 can set '1'. On the contrary, when at least one of the high frequency R, G and B components is '0', the low frequency component detector 400 can set '0'.

Figure 4:
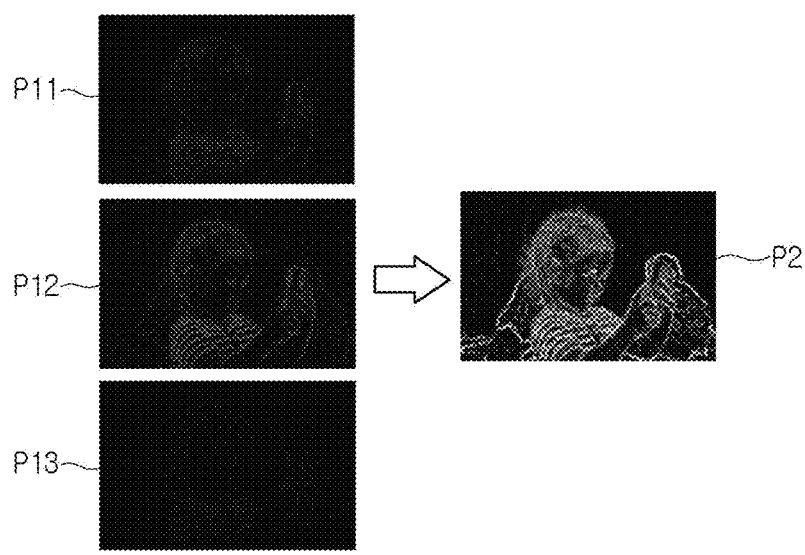
FIG. 4 is a diagram illustrating an operation of a low frequency component detector of an image conversion unit according to an embodiment of the present disclosure.

In detail, the low frequency component detector 400 can receive the high frequency component images P11, P12 and P13 shown in FIG. 4. Also, the low frequency component detector 400 compares the high frequency component images P11, P12 and P13 in a pixel unit. If any one of the same pixels on the high frequency component images P11, P12 and P13 is not '0', the low frequency component detector 400 sets '1'. On the contrary, when all of the same pixels on the high frequency component images is '0', the low frequency component detector 400 sets '0'. In this way, the low frequency component detector 400 can obtain a low frequency component image P2 from the high frequency component images P11, P12 and P13.

The frequency component detected by the low frequency component detector can be a fixed frequency band component. This results from the fact that the collected image is sequentially filtered by the high and low frequency component detectors 300 and 400 with filtering frequencies which overlaps with each other in the fixed frequency band. In other words, the serial circuit of the high and low frequency component detectors 300 and 400 can be used as a fixed frequency band component detector. Such a serial circuit of the high and low frequency component detectors 300 and 400 can greatly reduce computation time in comparison with a method of directly detecting the fixed frequency band component from the collected image.

The image processor 500 can interpolate (or filter) the bit-transformed 10-bit mode image and obtain an interpolated (or filtered) 10-bit mode image from the bit-transformed 10-bit mode image. In detail, the image processor 500 applies a filter mask to the region of the bit-transformed 10-bit mode image corresponding to the fixed frequency band component supplied from the low frequency component detector 400. In accordance therewith, the interpolated 10-bit mode image can be output from the image processor 500. The filter mask can be an average filter mask.

Figure 5:
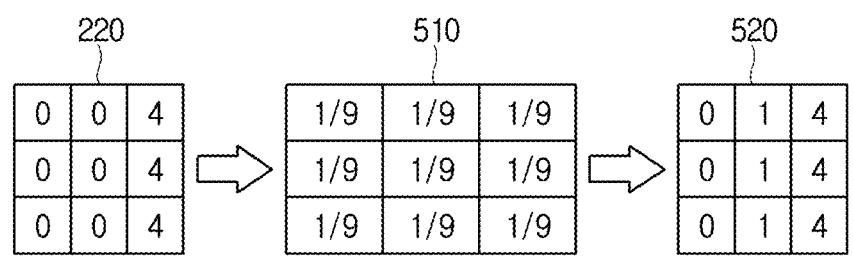
FIG. 5 is a diagram illustrating an operation of an image process of the image conversion unit according to an embodiment of the present disclosure.

More specifically, the image processor 500 can receive the bit-transformed 10-bit mode image 220 (shown in FIG. 5) from the bit mode transformer 200. The image processor 500 can apply the average filter mask 510 to regions of the bit-transformed 10-bit mode image 220 corresponding to the fixed frequency band component from the low frequency component detector 400. The average filter mask can become a 3-by-3 mask. The average filter mask 510 applied to the bit-transformed 10-bit mode image 220 allows the interpolated 10-bit mode image 520 to be generated. As seen from the interpolated 10-bit mode image, all central column pixels have a value of '1'. As such, the gradations on the image can become finer.

Figure 6:
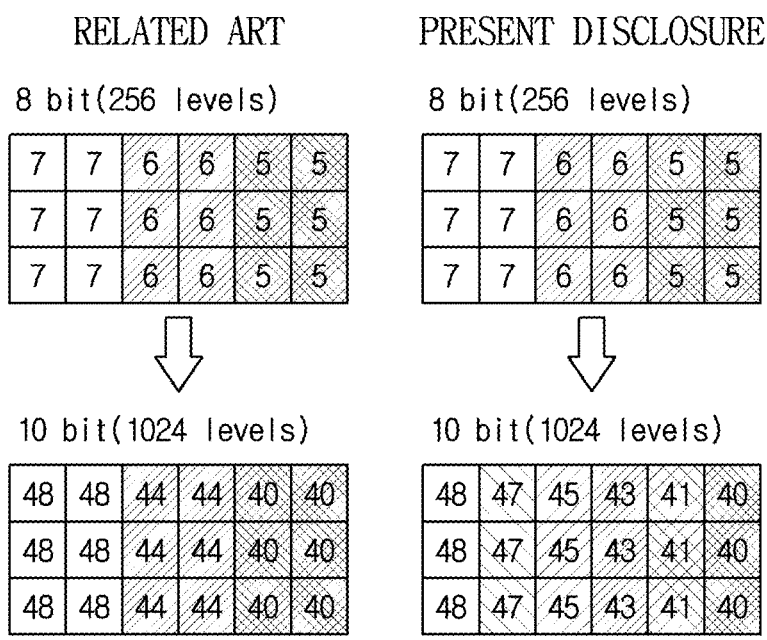
FIGS. 6 and 7 are diagrams comparing output properties of image conversion units according to the present disclosure and the related art.

Referring to FIG. 6, examples of expanded images before and after the conversion operation of the image conversion unit are shown. As seen from the examples, the blocks on the left side of FIG. 6 indicates that the 10-bit mode image converted by the image conversion unit of the related art has three steps of gradation. On the other hand, the 10-bit mode image converted by the image conversion unit of the present disclosure has six steps of gradation. In other words, the 10-bit mode image of the present has finer gradation compared with that of the related art. As such, the 10-bit mode of the present disclosure can become softer or smoother than that of the related art.

Reverting to FIG. 1, the display unit 2000 can be an OLED device. As such, an organic emission layer (not shown) can be included in the display device. The organic emission layer can be disposed first and second electrodes (not shown). Alternatively, a hole injection layer (not shown), a hole transport layer (not shown), an organic emission layer (not shown), an electron transport layer (not shown) and an electron injection layer (not shown) sequentially stacked between first and second electrode layers can be included in the display device 200.

The first electrode layer can be in contact with a driving TFT (thin film transistor). Also, the first electrode layer can be used as either anode with a reflective layer or a cathode electrode, according to a connection structure with the driving TFT. Moreover, the first electrode can be formed from a transparent conductive material including an oxide such as ITO (indium-tin-oxide), IZO (indium-zinc-oxide), ITZO (indium-tin-zinc-oxide) or others. Furthermore, the first electrode layer can be formed on a reflective layer, which is formed an opaque conductive material, and patterned in a pixel unit. Such a first electrode layer transfers holes from the driving TFT to the organic emission layer via the hole injection layer and the hole transport layer.

The second electrode layer can become a cathode electrode when the first electrode layer is used as an anode electrode. Also, the second electrode layer can be formed from a metal material and in a single layer structure. Alternatively, the second electrode layer can be formed in a multi-layered structure which has first and second electrodes interposed between dielectric layers.

The OLED device is used as the display unit 2000 as described above, but the present disclosure is not limited to this. In other words, the display device 2000 can become an LCD device.

Figure 7:
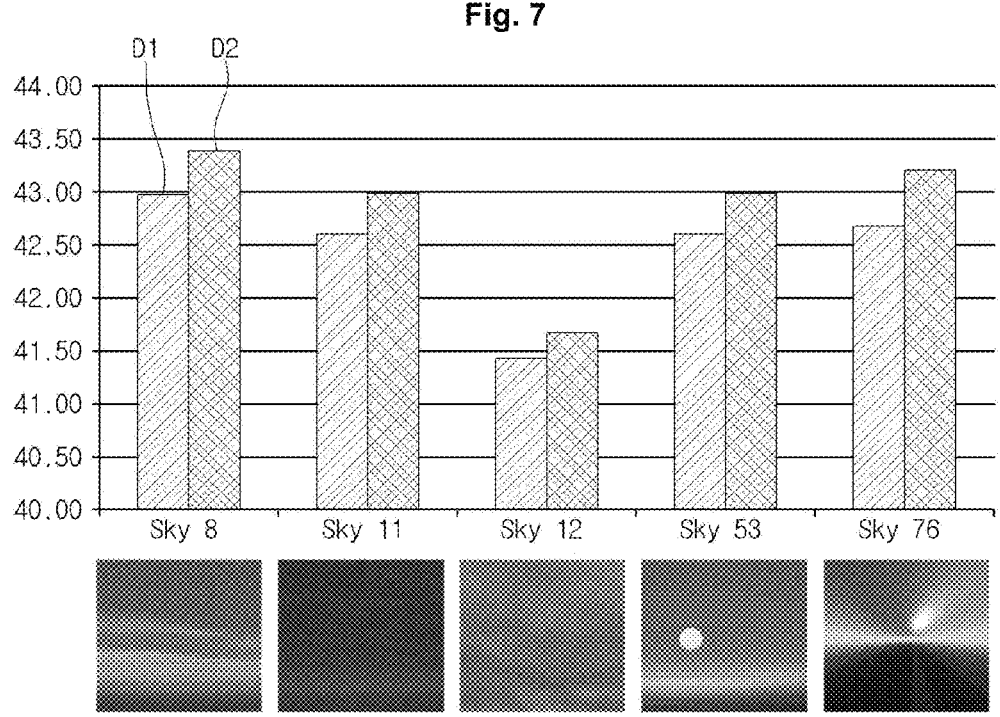

Referring to FIG. 7, PSNRs (peak signal to noise ratios) of image conversion units according to the present disclosure and the related art are compared with each other. The PSNRs are obtained when a variety of images such as sky8, sky11, sky22, sky53 and sky76 are converted by the image conversion units of the related art and the present disclosure. The 'PSNR' allows a difference between two images before and after conversion of image to be compared. A high PSNR means that the difference between the two images is small. In FIG. 7, D1 indicates PSNRs of a 6-to-8 image conversion unit of the related art and D2 indicates PSNRs of the 8-to-10 image conversion unit of the present disclosure. As seen from FIG. 7, the image conversion unit of the present disclosure increases PSNR compared to that of the related art.

Figure 8:
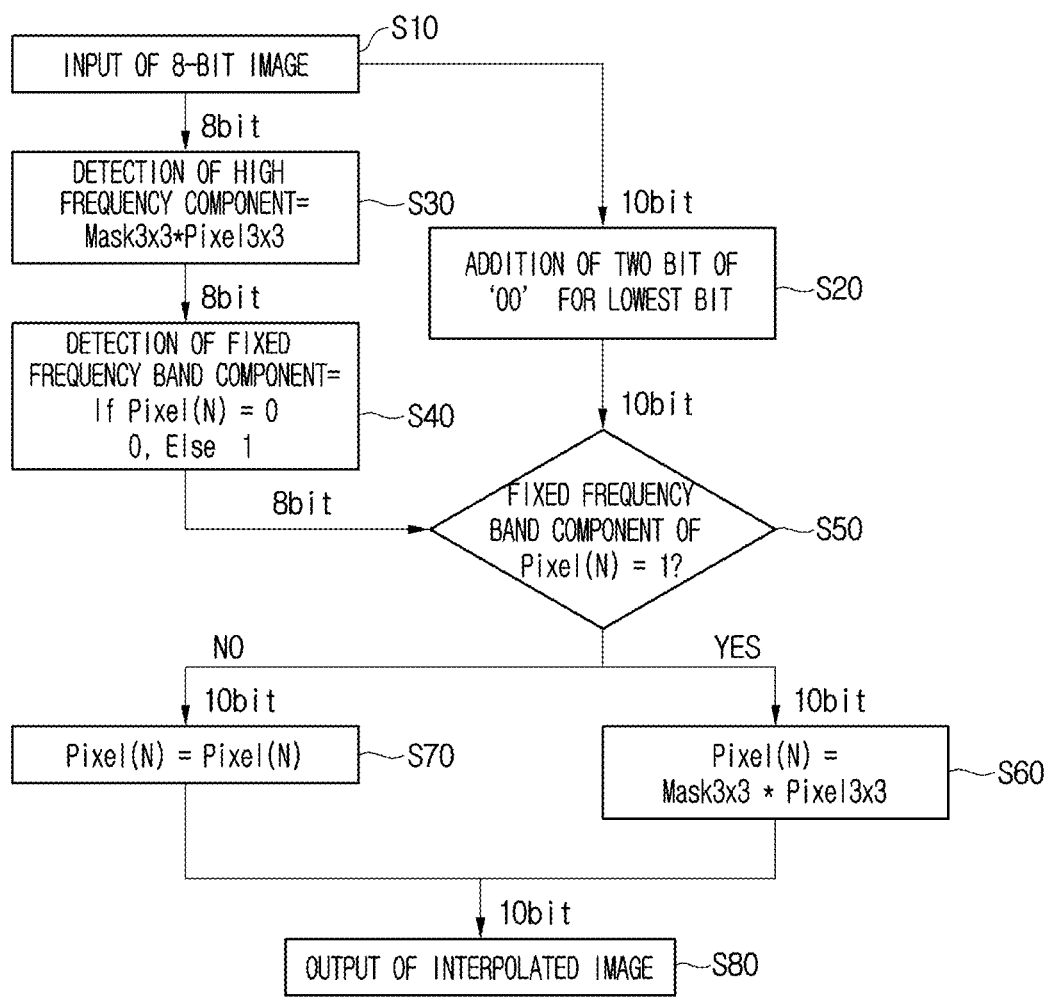
FIG. 8 is a flowchart illustrating an operation procedure of an image conversion unit according to an embodiment of the present disclosure.

Subsequently, an operation procedure of the image conversion unit according to an embodiment of the present disclosure will be described in detail. FIG. 8 is a flowchart illustrating an operation procedure of the image conversion unit of an embodiment of the present disclosure.

As shown in FIG. 8, when an 8-bit mode image is input S10, a bit-transformed 10-bit mode image is generated by adding S20 two bits of '00' to the lowest bit of the 8-bit mod image.

Meanwhile, a high frequency component is detected (or extracted) S30 from the 8-bit mode image. The high frequency component can be obtained by a high frequency detection mask. In detail, the high frequency component can be detected by a 3-by-3 mask. Also, the high frequency component can include high frequency R, G and B component images by analyzing each of R, G and B image components.

After the high frequency component is detected from the 8-bit mode image, a process of detecting a low frequency component from the high frequency component is performed S40. The frequency component detected (or extracted) from the high frequency component can be provided as a fixed frequency band component. The fixed frequency band component can be obtained by setting '1' when any one of the same pixels on the high frequency R, G and B component images is not '0' or else setting '0' when at least one of the same pixels on the high frequency R, G and B components.

Thereafter, it can be determined S50 whether or not the fixed frequency band component opposite to each pixel on the bit-transformed 10-bit mode image is '1'. If the fixed frequency band component is '1', the respective pixel on the bit-transformed 10-bit mode image can be interpolated (or filtered) S60 using an average filter mask. On the contrary, when the fixed frequency band component is not '1', the respective pixel is originally used S70 without any interpolation.

The steps S50, S60 and S70 forming a selective pixel interpolation are repeatedly performed for all the pixels on the transformed 10-bit mode image. In accordance therewith, regions of the bit-transformed 10-bit mode image corresponding to the fixed frequency band component can be interpolated (or filtered). When the selective pixel interpolation for all the pixels on the transformed 10-bit mode image is completed, an interpolated (or filtered) 10-bit mode image can be output S80.

Although the present disclosure has been limitedly explained regarding only the embodiments described above, it should be understood by the ordinary skilled person in the art that the present disclosure is not limited to these embodiments, but rather that various changes or modifications thereof are possible without departing from the spirit of the present disclosure. Accordingly, the scope of the present disclosure shall be determined only by the appended claims and their equivalents without being limited to the description of the present disclosure.

What is claimed is:
1. A data conversion unit comprising:
a bit mode transformer circuit having an input for receiving a first bit mode image, the first bit mode image including components of a first bit length, and an output providing a second bit mode image, the second bit mode image including components of a second bit length longer than the first bit length;

a high frequency component detector circuit receiving the first bit mode image, dividing the first bit mode image into a plurality of color component images, and detecting high frequency components in each of the color component images to generate a plurality of high frequency component images;

a low frequency component detector circuit having an input coupled to the high frequency component detector circuit, and an output providing a low frequency component image based on each of the plurality of high frequency component images; and an image processor having a first input receiving the output of the bit mode transformer circuit, a second input receiving the output of the low frequency component detector circuit, and an output providing an interpolated second bit mode image, the image processor configured to apply a filter mask to the regions of the second bit mode image based on the low frequency component image to generate the interpolated second bit mode image.

2. The data conversion unit of claim 1, wherein the second bit mode image is obtained by adding a fixed number of bits of zero values as lowest bits in the components of the first bit mode image.

3. The data conversion unit of claim 1, wherein the high frequency component detector circuit is configured to generate the plurality of high frequency component images by applying a high frequency component detection mask to each of the color component images of the first bit mode image.

4. The data conversion unit of claim 1, wherein the low frequency component detector circuit is configured to generate the low frequency component image by setting:
components in the low frequency component image with a bit value of "1" when any one among corresponding high frequency R, G and B components in the second bit mode image is not "0"; and
components in the low frequency component image with a bit value of "0" when all of the corresponding high frequency R, G and B components in the second bit mode image is "0".

5. The data conversion unit of claim 1, wherein the filter mask is an average filter mask.

6. The data conversion unit of claim 1, wherein the first bit mode image is an 8-bit mode image and the second bit mode image is a 10-bit mode image.

7. A display device comprising:
an image conversion unit comprising:
a bit mode transformer circuit having an input for receiving a first bit mode image, the first bit mode image including components of a first bit length, and an output providing a second bit mode image, the second bit mode image including components of a second bit length longer than the first bit length,
a high frequency component detector circuit receiving the first bit mode image, dividing the first bit mode image into a plurality of color component images, and detecting high frequency components in each of the color component images to generate a plurality of high frequency component images;
a low frequency component detector circuit having an input coupled to the high frequency component detector circuit, and an output providing a low frequency component image based on each of the plurality of high frequency component images; and
an image processor having a first input receiving the output of the bit mode transformer circuit, a second input receiving the output of the low frequency component detector circuit, and an output providing an interpolated second bit mode image, the image processor configured to apply a filter mask to the regions of the second bit mode image based on the low frequency component image to generate an interpolated second bit mode image; and
a display unit configured to display the interpolated second bit mode image received from the image conversion unit.

8. The display device of claim 7, wherein the high frequency component detector circuit is configured to generate the plurality of high frequency component images by applying a high frequency component detection mask to each of the color component images of the first bit mode image.

9. The display device of claim 7, wherein the low frequency component detector circuit is configured to generate the low frequency component image by setting:
components in the low frequency component image with a bit value of "1" when any one among corresponding high frequency R, G and B components in the second bit mode image is not "0"; and
components in low frequency component image with a bit value of "0" when all of the corresponding high frequency R, G and B components in the second bit mode image is "0".

10. The display device of claim 7, wherein the filter mask is an average filter mask.

11. The display device of claim 7, wherein the first bit mode image is an 8-bit mode image and the second bit mode image is a 10-bit mode image.

12. A method of converting image data, comprising:
transforming a first bit mode image including components of a first bit length into a second bit mode image of a second bit length longer than the first bit length;
dividing the first bit mode image into a plurality of color component images;
generating a plurality of high frequency component images detecting high frequency components in each of the color component images;
generating a low frequency component image based on each of the plurality of high frequency component images; and
applying a filter mask to the regions of the second bit mode image based on the low frequency component image to generate an interpolated second bit mode image.

13. The method of claim 12, wherein the transforming of the first bit mode image into the second bit mode image comprises adding a fixed number of bits of zero values as lowest bits in the components of the first bit mode image.

14. The method of claim 12, wherein detecting the high frequency component comprises applying a high frequency component detection mask to each of the color component images of the first bit mode image.

15. The method of claim 12, wherein generating the low frequency component image comprises:
setting components in the low frequency component image with a bit value of "1" when any one among corresponding high frequency R, G and B components in the second bit mode image is not "0"; and
setting components in the low frequency component image with a bit value of "0" when all of the corresponding high frequency R, G and B components in the second bit mode image is "0".

16. The method of claim 12, wherein the filter mask is an average filter mask.

17. A non-transitory computer readable storage medium storing instructions thereon, the instructions when executed by a processor cause the processor to:
   transform a first bit mode image including components of a first bit length into a second bit mode image of a second bit length longer than the first bit length;
   divide the first bit mode image into a plurality of color component images;
   generate a plurality of high frequency component images detecting high frequency components in each of the color component images;
   generate a low frequency component image based on each of the plurality of high frequency component images; and
   apply a filter mask to the regions of the second bit mode image based on the low frequency component image to generate an interpolated second bit mode image.

\* \* \* \* \*